United States Patent
Kosuru et al.

(10) Patent No.: US 7,343,370 B2
(45) Date of Patent: Mar. 11, 2008

(54) PLAN GENERATION IN DATABASE QUERY OPTIMIZERS THROUGH SPECIFICATION OF PLAN PATTERNS

(75) Inventors: Ramakumar Kosuru, Cupertino, CA (US); Awny Al-Omari, Cedar Park, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 348 days.

(21) Appl. No.: 11/074,343

(22) Filed: Mar. 7, 2005

(65) Prior Publication Data

US 2006/0200451 A1    Sep. 7, 2006

(51) Int. Cl.
*G06F 7/00* (2006.01)
*G06F 17/00* (2006.01)

(52) U.S. Cl. .......................................... 707/3
(58) Field of Classification Search .................... 707/3, 707/4, 5; 717/140, 144
See application file for complete search history.

(56) References Cited

U.S. PATENT DOCUMENTS

| | | | | |
|---|---|---|---|---|
| 5,598,559 | A | * | 1/1997 | Chaudhuri ...................... 707/2 |
| 6,801,905 | B2 | * | 10/2004 | Andrei ........................ 707/2 |
| 2005/0187958 | A1 | * | 8/2005 | Wong ........................ 707/101 |

FOREIGN PATENT DOCUMENTS

GB    2290893 A  *  1/1996

* cited by examiner

*Primary Examiner*—Sam Rimell

(57) ABSTRACT

Methods and systems receive a query, receive a control statement that represents at least a portion of a desired execution plan associated with the query, and produce an execution plan that conforms to the desired plan to the extent that the produced plan preserves the semantics of the query, without requiring an exhaustive search. These methods also enable realization of bushy shaped plans that are outside the scope of the optimizer search space.

15 Claims, 7 Drawing Sheets

PLAN GENERATION IN DATABASE QUERY OPTIMIZERS THROUGH SPECIFICATION OF PLAN PATTERNS

BACKGROUND

Nonstop systems are highly scalable, fault-tolerant database systems that are capable of analyzing large amounts of data. Nonstop SQL/MX is a state of the art database management system that is designed to handle complex database queries.

A SQL/MX compiler consists of several phases to generate an efficient execution plan. First, a query is passed to a parser where syntactic checking is performed and an initial query tree is built. Next, a binder performs semantic checks and binds query variables to database objects. This is followed by a normalizer phase where subquery transformation and other unconditional query transformations take place. The normalizer transforms the query into a canonical tree form before passing it to an optimizer to determine the execution strategy (i.e., the plan). The optimization search space is determined by the set of transformation and implementation rules used by the optimizer. Rules are applied recursively to the initial normalized tree transforming it into semantically equivalent query trees. The transitive closure of the rules applications defines the optimization search space. The optimizer output is a single plan with the lowest cost among all traversed plans in the search space, based on the optimizer's cost model.

DETAILED DESCRIPTION

Overview

In order to circumvent the large search space discussed above, the system and methods about to be described provide a means for finding a plan without exhaustive enumeration. Often, the database user may want to try an execution plan other than the one chosen by the optimizer. Alternatively, the user may want to force a particular property or portion of the execution plan and leave the optimizer to decide about other aspects or portions of the execution plan.

Control statements provide a way for the user to influence the optimizer and force a particular plan. The described system and methods speed up compilation time significantly when control statements are specified as full or partial plan patterns. This is achieved by doing a semantic-preserving logical rewrite to the query plan prior to optimization. After the logical rewrite of the query, the full exhaustive search is no longer necessary. In addition, in at least some embodiments, certain valid query shapes (e.g., some bushy shapes) that are outside the search space can be forced without incurring additional compile time. This is possible as the local rewrite phase can deduce validity and soundness of the request SQL query shape.

The system and methods about to be described make it possible for the optimizer to compile the query using fewer resources such as memory and processing. Experiments have shown that such processing results in considerable savings in compile time. In addition, bushy shapes can now be forced. Bushy shapes are those in which there is at least one join between two intermediate results. This is in contrast with left-linear shapes in which no intermediate result is ever the inner operand of a join. Bushy shapes can be evaluated with a higher degree of parallelism than the left-linear shapes if there is sufficient memory and an adequate number of processors.

Exemplary Compiler

Figure 1:
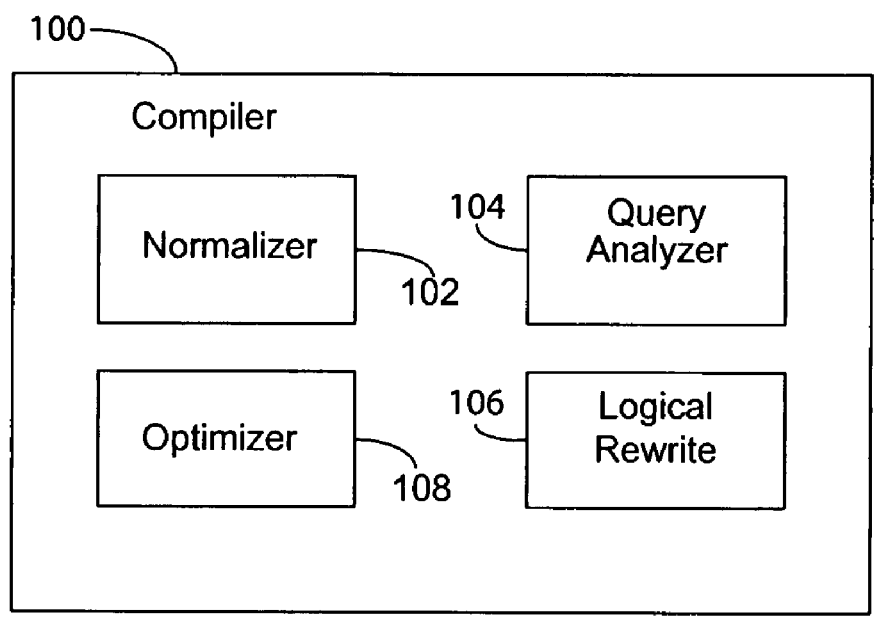
FIG. 1 is a block diagram showing exemplary components of a compiler in accordance with one embodiment.

For purposes of understanding various structures associated with an exemplary database compiler, consider FIG. 1.

FIG. 1 is a block diagram showing exemplary components of a database compiler in the form of an SQL/MX compiler 100 in accordance with one embodiment. It will be appreciated and understood that the illustrated SQL/MX compiler constitutes but one exemplary database compiler and is not intended to be limiting in any way. Accordingly, other database compilers can be used in connection with the inventive techniques and systems described herein. These other database compilers can have components that are different from those described immediately below. In the illustrated and described embodiments, the compiler and associated components are implemented in the form of software components embodied as computer-readable instructions on some type of computer-readable media. It is to be appreciated, however, that various aspects of the described embodiments can be implemented in connection with any suitable hardware, software, firmware or combination thereof.

Compiler 100 includes, in this example, a normalizer 102 which receives input from a parser/binder (not shown). The normalizer transforms the query tree into a canonical form and a query analyzer 104 takes as input the normalized query tree (NQT). Among other things, the query analyzer simplifies transformation and the shaping of the tree by determining if a particular transformation would preserve semantics. Preserving semantics ensures that the user's query is not transformed to the point where it would yield results different from his original query. A logical rewrite component 106 transforms the normalized tree according to a user-desired plan only to the extent that the transformation is semantically valid. An optimizer 108 takes the transformed tree and outputs a complete execution plan.

If the user specified a valid plan pattern that preserved the semantics of his query, the optimizer outputs the cheapest plan that conforms to the shape. However, if the user specified a partial plan pattern, the optimizer outputs a plan, incorporating the user-desired plan pattern, with the lowest cost among all traversed plans in the search space.

Exemplary Methods

To fully appreciate the exemplary methods about to be described, one should understand, at least in a basic sense, the concepts of join backbones (JBBs), JBB children, and JBB subsets.

A join backbone is the notion of multi-way join between two or more relational expressions. These relational expressions will be referred to as the Join Backbone children (JBBC). The JBB is defined by the JBBC as well as the join types and join predicates between these children. After the normalizer has normalized the query tree, the tree is analyzed to identify the join backbones. The JBB is set during the analysis phase and remains unchanged during the optimization process. The JBB can be thought of as an invariant representation of the original join nodes, which is independent of the relative order of these nodes in the initial tree. Note that a query may have several join backbones. For example, in FIG. 2, the query tree has a major JBB joining T1, T2, T3, and the Group By subquery. This backbone has four JBBC—namely, T1, T2, T3, and the Group By Operator. In addition, there is a second JBB in the subquery joining T4 and T5. The second JBB has two JBBC—T4 and T5.

Figure 2:
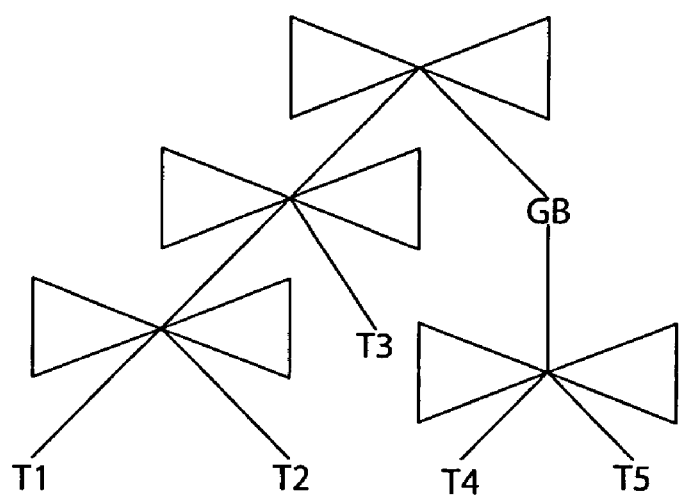
FIG. 2 is an exemplary tree to illustrate join backbones.

A JBB subset is a subset of the JBB children joined together. The subset has no notion of order between the JBBC. It also has no notion of composition except as a flat set of JBBC. This simple structure is most useful as it defines the logical equivalence between the different subtrees. That is, two expressions are logically equivalent if they have the same JBB subset (and Characteristic Inputs). To illustrate, possible JBB subsets of the first JBB in FIG. 2 are {T1}, {T2}, {T3}, {GB}, {T1, T2}, {T1, T3}, {T1, GB}, {T2, T3}, {T2, GB}, {T3, GB}, {T1, T2, T3}, {T1, T2, GB}, {T1, T3, GB}, {T2, T3, GB}, and {T1, T2, T3, GB}.

Exemplary Method for Tree with Join Nodes

Figure 3:
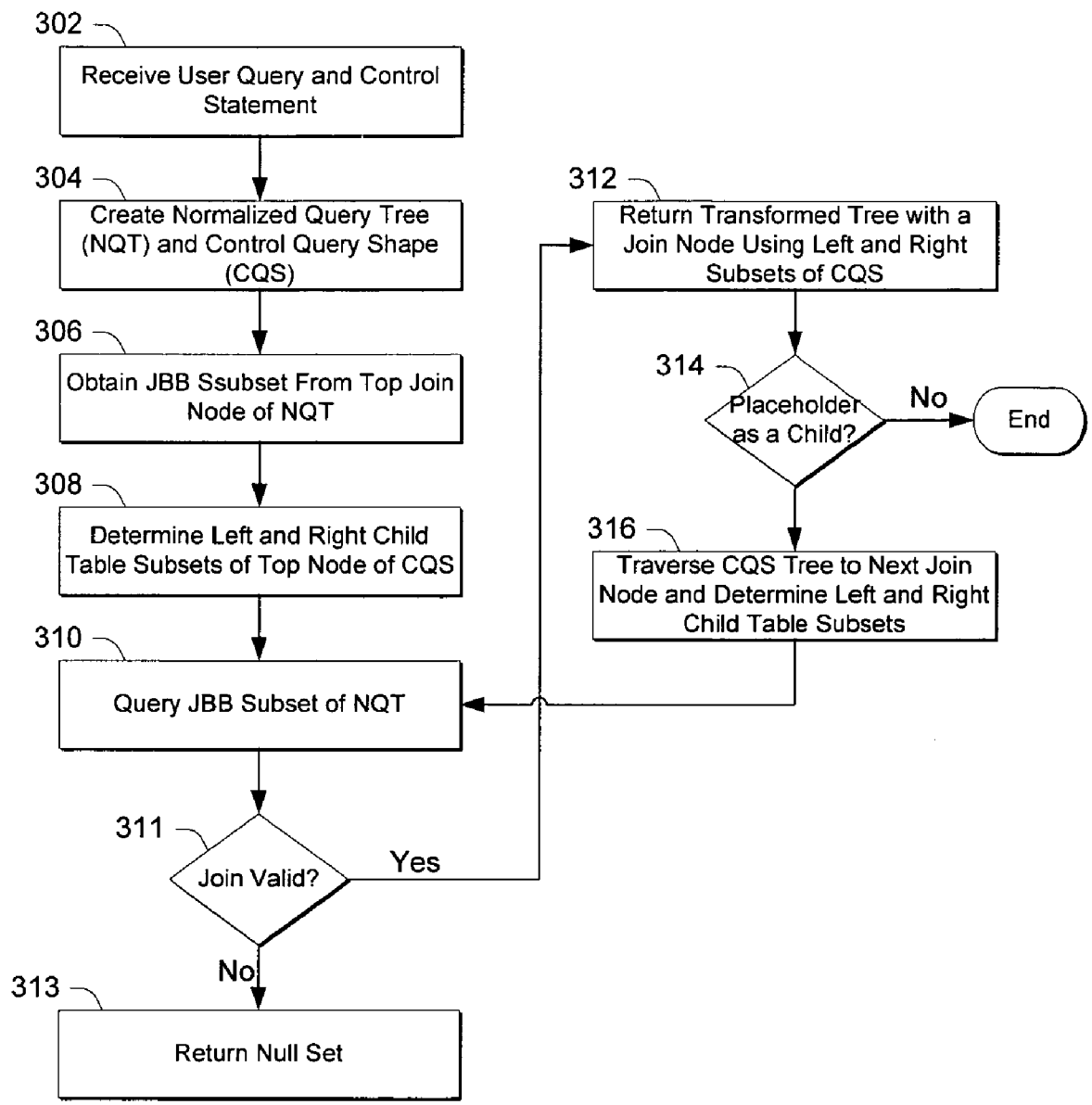
FIG. 3 is a flow diagram that describes steps in a method in accordance with one embodiment.

With those concepts in mind, reference is made to FIGS. 3 and 4. FIG. 3 is a flow diagram that describes steps in a method in accordance with one embodiment. The method can be implemented in any suitable hardware, software, firmware or combination thereof. In one embodiment, the method about to be described can be implemented in connection with a system such as the one shown and described in relation to FIG. 1. FIG. 4 illustrates an example relating to the method of FIG. 3.

Referring to FIG. 3, step 302 receives a user query and control statement. Step 304 creates both a normalized query tree (NQT) based on the user query and also a tree representation of a control query shape (CQS) based on the user's control statement. Examples of a CQS tree and a NQT for a given user query and control statement are given in FIG. 4A as 402 and 404, respectively.

Referring back to FIG. 3, step 306 obtains the JBB subset from the top join node of the NQT 404. The JBB subset returned from the NQT of FIG. 4A would be [1,2,3,4,5,6]. The elements of this JBB subset represent all tables which the user is querying. Step 308 then determines the left and right child table subsets of the top node of CQS 402. With reference to the CQS tree in FIG. 4A, the left child table subset is [1,2,3,5,6] and the right child table subset is [4]. Because these subsets are derived from the CQS 402, they represent characteristics of the user-desired plan.

Referring back to FIG. 3, given the left and right child table subsets of the CQS 402, step 310 queries the JBB subset of the NQT 404 to give the join node with the left and right child table subsets. If such a join is semantically valid (step 311), the query analyzer 104 (from FIG. 1) would provide the join (step 312 discussed below). The join node returned by the query analyzer has place-holders as children if the children are not JBBC. It points to actual children if they are JBBC. However, if a join with the left and right child table subsets would not preserve semantics, the query analyzer returns a NULL rather than the requested join node (step 313). In the latter case, because the CQS 402 requested placement of nodes in a join that is not permitted by the user query, control is transferred to the optimizer.

Figure 4A:
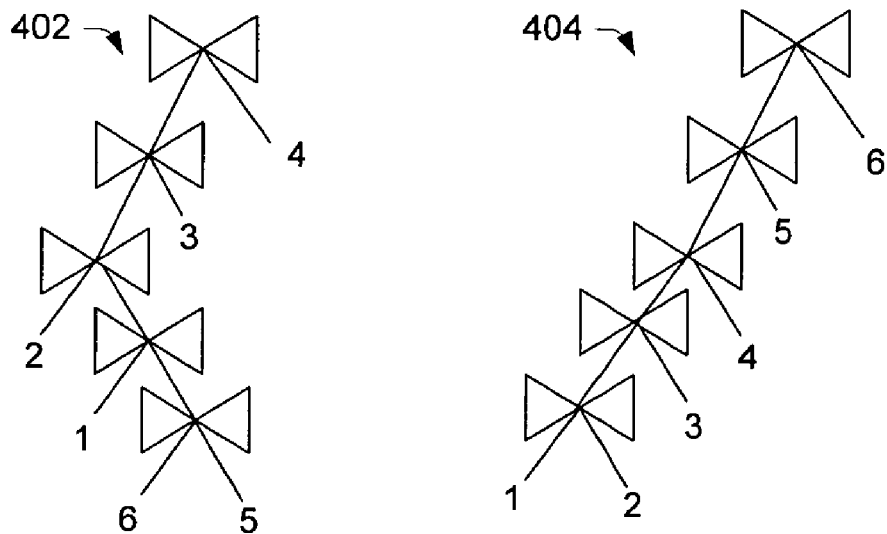
FIGS. 4A-F illustrate an example relating to the method of FIG. 3.
Figure 4B:
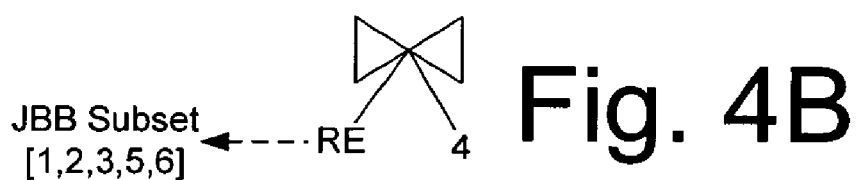
Figure 4C:
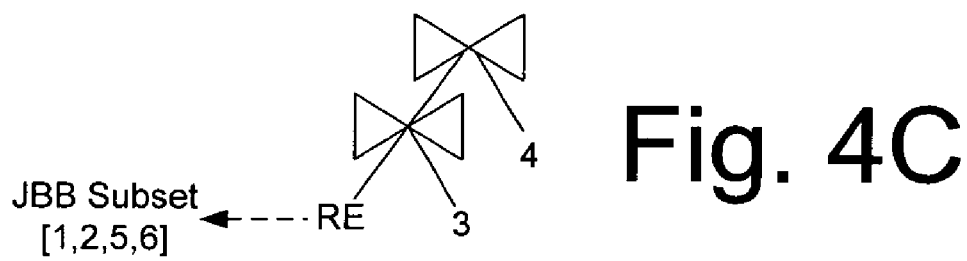
Figure 4D:
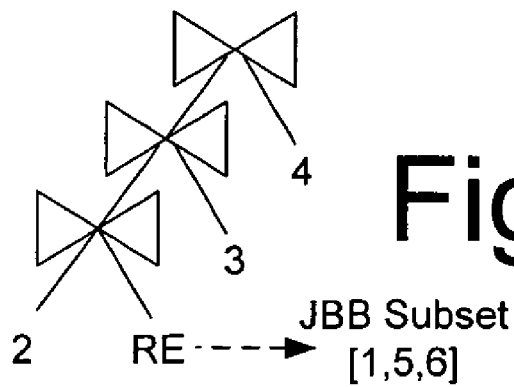
Figure 4E:
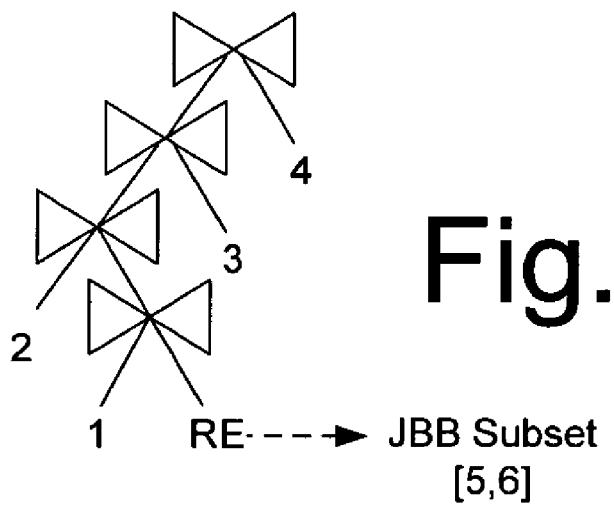
Figure 4F:
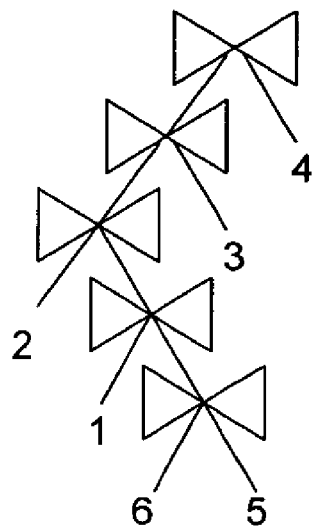

Referring to the example in FIGS. 4A-4F, the requested join does preserve semantics. Therefore, the query analyzer returns a transformed tree with a join node using the left and right subsets of CQS (see step 312 of FIG. 3). Specifically, the method returns a join node with children as shown in FIG. 4B. The right child is a JBBC (the actual scan node). The left child is a place-holder relational expression that has the information on the corresponding JBB subset.

Step 314 then determines whether the query analyzer returned a join node with a placeholder as a child. If not, the transformed tree has been completed and the logical rewrite phase ends. On the other hand, if the query analyzer did return a join node with a placeholder as a child, step 316 traverses the CQS tree to the next join node and determines the left and right child table subsets. In one embodiment, pure physical operators (e.g., exchange, materialize, and sort) are ignored during traversal of the CQS tree. If a pure physical operator is encountered during traversal of the CQS tree, step 316 simply traverses to the child to determine the child table subset(s). In the example of FIG. 4, the left child table subset is [1,2,5,6], and the right child table subset is [3]. In the illustrated and described example, the following pure physical operators are ignored: exchange, materialize, and sort. When these or similar operators are encountered in the CQS tree, the method simply traverses to their children. Referring back to FIG. 3, control passes back up to step 310.

FIGS. 4C-4F illustrate the development of the transformed tree after each join node returned by the query analyzer in the example. For simplicity, it is assumed in this example that each requested join is semantics preserving. As discussed above, if a requested join does not preserve semantics, the query analyzer returns a NULL and control passes to the optimizer so that it can find a plan that matches the user's control statement to the extent possible while satisfying the optimizer's cost model to the greatest extent.

Hence, the above-described method creates a transformed tree based on a user-desired plan, which is represented by a CQS tree. However, if the NQT contains one or more group-by nodes, modification of the FIG. 3 method may be employed to deal with the group-by node(s). Exemplary modifications are discussed below in the following three sections.

Exemplary Methods for NQT with One Group-by Node but Only One JBB

If there is only one group-by node and only one JBB, it follows that the group-by node is either on top of a single scan node or is the top node of the NQT. In either case, the group-by node is ignored and the method of FIG. 3 may be utilized to create a transformed tree. If the group-by node is on top of a single scan node in the NQT, it is left on top of the scan node in the transformed tree. However, if the group-by node is the top node of the NQT, the group-by node is placed on top of the transformed tree. In such a case, the optimizer later moves the group-by node from the top of the transformed tree to the desired location as indicated by the CQS tree.

Exemplary Method for NQT with One Group-by Node but Two JBBs

If there is only one group-by node, but it splits the NQT into two JBBs, then the method of creating a transformed tree is similar to that shown in FIG. 3. However, when the query analyzer returns the group-by node as a child (JBBC) in step 312, the modified method will continue to operate on the JBB subset obtained from the child of the group-by node.

Exemplary Method for NQT with Multiple Group-by Nodes

In some situations, the NQT may have multiple group-by nodes for at least one of two reasons. One reason may be that a transformation made by the binder or normalizer (component 102 of FIG. 1) introduces a group-by node during a transformation. An example of such a transformation is view in-lining. Another reason for multiple group-by nodes may be that the user query contains a subquery (or derived table) with a group-by node, and there is a group-by node in the outer block. In either case, a modification of the method of FIG. 3 may be utilized. One possible modification is illustrated by way of the example of FIGS. 5A-F.

Figure 5A:
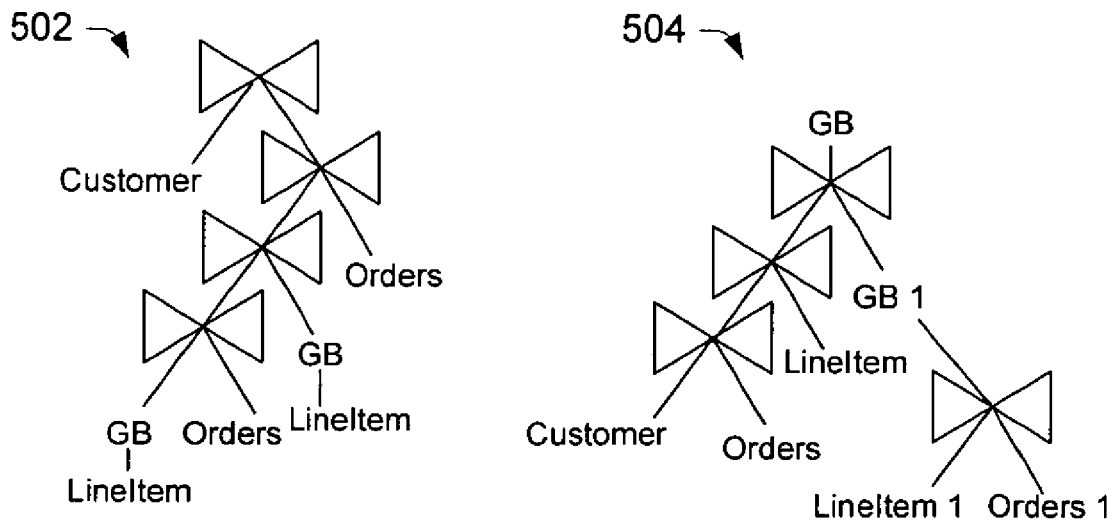
FIGS. 5A-F illustrate an example relating to one possible modification of the method of FIG. 3.
Figure 5B:
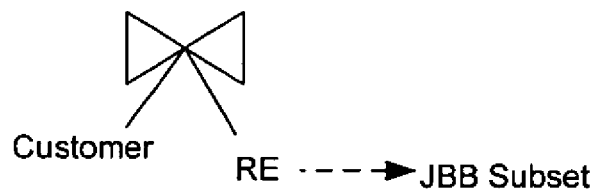

Examples of a CQS tree and a NQT for a given user query and control statement are given in FIG. 5A as 502 and 504, respectively. The scan nodes under the first group-by node (GB1) are labeled as LINEITEM1 and ORDERS1 so as to distinguish them from similarly-named tables in the main block of the query. In actual implementation this is achieved by having a distinct identifier for each occurrence of a scan operation on the same base table. On the CQS tree 502, the left child table subset and right child subsets (if exists) are computed for each node. On the NQT 504 of FIG. 5A, the JBB subset of the join node labeled as 1 is obtained. The JBB subset is queried to give the join node with the left and right child table subsets of the top node of the CQS tree. In the example of FIG. 5, the left child table subset is [CUSTOMER], and the right child table subset is [LINEITEM, ORDERS, LINEITEM1, ORDERS1]. If such a join is semantically valid, the query analyzer 104 (from FIG. 1) would provide the join. In this example, it is assumed, for the sake of simplicity, that all requested joins are semantically valid. Therefore, in FIG. 5B, the query analyzer returns a join node with a place-holder (RE) as the right child and CUSTOMER (JBBC) as the left child.

Figure 5C:
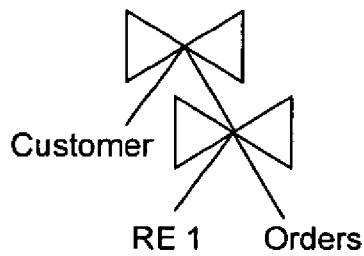
Figure 5D:
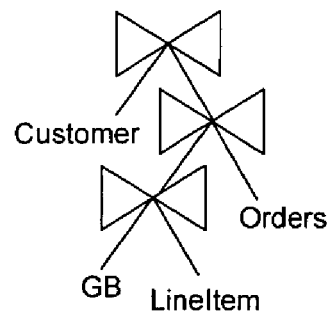

Given the JBB subset of RE (the place holder), the JBB subset is queried to give the join node with the left and right child table subsets of the next join node of the CQS tree. The left child table subset at this point is [LINEITEM, LINEITEM1, ORDERS1], and the right child table subset is [ORDERS]. As shown in FIG. 5C, this returns a join node with the right child ORDERS (JBBC). RE (the place-holder of FIG. 5B) is replaced by this join. The left child of FIG. 5C is a new place-holder (RE1). Because the children of GB1 belong to a new JBB, the JBB subset of GB1 is queried to give the join node with the left and right child table subsets ([LINEITEM1,ORDERS1] and [LINEITEM], respectively). The placeholder RE1 of FIG. 5C is replaced by the join node returned by the query analyzer. As shown in FIG. 5D, there are two JBBC of the join—the left-child is GB1, and the right-child is LINEITEM.

Figure 5E:
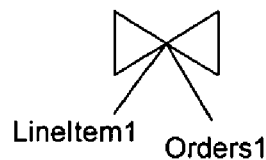
Figure 5F:
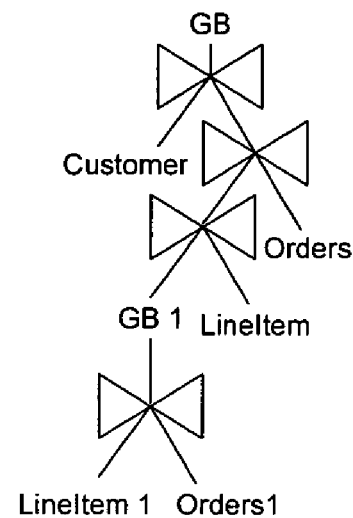

The JBBSubset of GB1.child(0) is then queried with the left and right child table subsets of the nextjoin node of the CQS tree ([LINEITEM1] and [ORDERS1], respectively). The result is shown in FIG. 5E. The logical rewrite phase is then completed in FIG. 5F after leaving the group-by nodes on top of the respective JBBs. FIG. 5G shows the eventual plan after the optimizer places the group-by nodes as requested by the user in the CQS.

Figure 6:
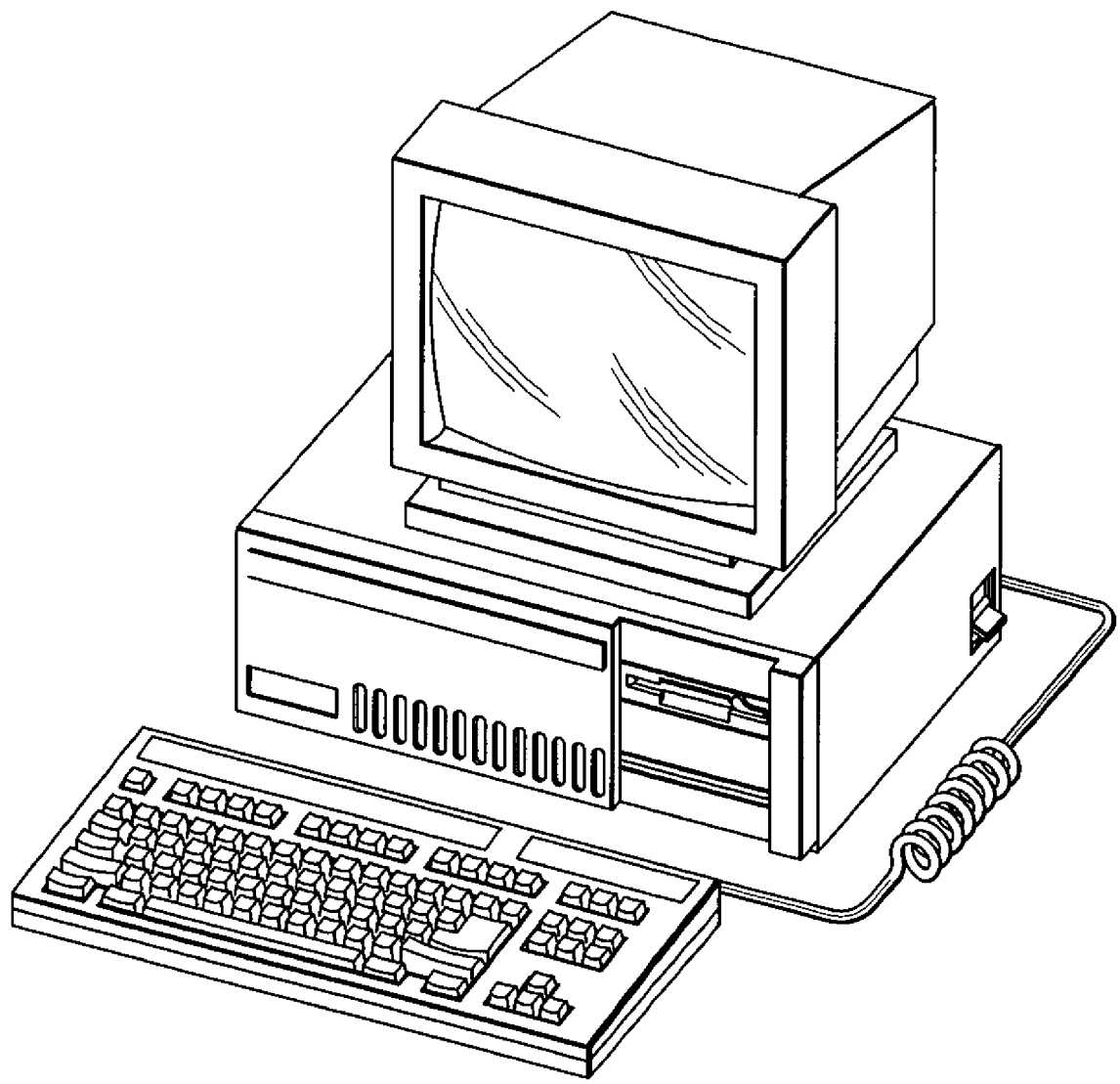
FIG. 6 is a view of an exemplary computer system with which the exemplary embodiments can be employed.

The various embodiments described above can be implemented in connection with and using a suitably configured computer, such as the one shown in FIG. 6.

The system and methods described above provide a means for forcing a plan without exhaustive enumeration. Control statements provide a way for the user to influence the optimizer and force a particular plan. The described system and methods force the particular plan pattern efficiently when control statements are specified as full or partial plan patterns. This is achieved by doing a semantics-preserving logical rewrite to the query plan prior to optimization. After the logical rewrite of the query, the full exhaustive search is no longer necessary. Another advantage is that certain valid query shapes (e.g., some bushy shapes) that are outside the search space can be forced without incurring additional compile time. This is possible because the logical rewrite phase can deduce validity and soundness of the requested query shape. The system and methods described above make it possible for the optimizer to compile the query using fewer resources such as memory and processing.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A method comprising:
receiving a query;
creating a normalized query tree (NQT) corresponding to the query;
receiving a control statement that represents at least a portion of a desired execution plan associated with the query;
creating a control query shape (CQS) corresponding to the desired execution plan; and
producing a produced execution plan that conforms to the desired execution plan to the extent that the produced execution plan preserves the semantics of the query, wherein said producing comprises constructing a transformed shape with one or more join nodes, wherein each join node has children corresponding to left and right child table subsets of the CQS only if each said join node preserves the semantics of the query, and wherein said producing further comprises constructing a next join node if a returned join node has a place-holder relational expression.

2. The method of claim 1, wherein said constructing the transformed shape further comprises
determining a join backbone (JBB) subset of the NQT; and
recursively querying the JBB subset of the NQT to give the join node with the left and right child table subsets of the traversed CQS if the requested join is semantically consistent with the query.

3. The method of claim 2, wherein pure physical operators are ignored during traversal of the CQS.

4. The method of claim 3, wherein said pure physical operators comprise exchange, materialize and sort operators.

5. The method of claim 1, wherein said constructing a transformed shape comprises ignoring any single group-by node located at the top of the JBB and leaving the group-by node at the top of the transformed shape during a logical rewrite phase of compilation.

6. The method of claim 2, wherein recursively querying the JBB subset of the NQT comprises recursively querying the JBB subset obtained from a child of a group-by node which splits the NQT into two JBBs.

7. A computer program stored on one or more computer readable media for generating an execution plan, the program implementing a method comprising:
receiving a query;
creating a normalized query tree (NQT) corresponding to the query;
receiving a control statement that represents at least a portion of a desired execution plan associated with the query;
creating a control query shape (CQS) corresponding to the desired execution plan; and producing a produced execution plan that conforms to the desired execution plan to the extent that the produced execution plan preserves the semantics of the query, wherein said producing comprises constructing a transformed shape with one or more join nodes, wherein each join node has children corresponding to left and right child table subsets of the CQS only if each said join node preserves the semantics of the query, and wherein said producing further comprises constructing a next join node if a returned join node has a placeholder relational expression.

8. The computer program of claim 7, wherein said constructing the transformed shape further comprises:
   determining a join backbone (JBB) subset of the NQT; and
   recursively querying the JBB subset of the NQT to give the join node with the left and right child table subsets of the traversed CQS if the requested join is semantically consistent with the query.

9. The computer program of claim 8, wherein pure physical operators are ignored during traversal of the CQS.

10. The computer program of claim 9, wherein said pure physical operators comprise exchange, materialize and sort operators.

11. The computer program of claim 7, wherein said constructing a transformed shape comprises ignoring any single group-by node located at the top of the JBB and leaving the group-by node at the top of the transformed shape during a logical rewrite phase of compilation.

12. The computer program of claim 8, wherein recursively querying the JBB subset of the NQT comprises recursively querying the JBB subset obtained from a child of a group-by node which splits the NQT into two JBBs.

13. A compiler system for use in a computer, the compiler system comprising:
   a query analyzer configured to receive a normalized query tree (NQT) and determine whether a given operation would be logically consistent with a query represented by the NQT; and
   a logical rewrite component configured to receive a control statement representing a desired plan and to communicate with the query analyzer in order to produce a transformed shape representing an execution plan consistent with the semantics of the given query and one that attempts to conform to the desired plan, wherein the logical rewrite component constructs a next join node in the transformed shape if a returned join node in the transformed shape has a placeholder relational expression.

14. The compiler system of claim 13 further comprising a normalizer configured to receive the query and produce the normalized query tree (NQT).

15. The compiler system of claim 13 further comprising an optimizer configured to receive the transformed shape and to produce a complete plan conforming to the produced plan.

* * * * *